US006763995B1

(12) United States Patent
Song

(10) Patent No.: US 6,763,995 B1
(45) Date of Patent: Jul. 20, 2004

(54) METHOD AND SYSTEM FOR ILLUSTRATING SOUND AND TEXT

(75) Inventor: Jin K. Song, Bedford, TX (US)

(73) Assignee: PIL, L.L.C., Lincolnwood, IL (US)

( * ) Notice: Subject to any disclaimer, the term of this patent is extended or adjusted under 35 U.S.C. 154(b) by 0 days.

(21) Appl. No.: 09/557,644

(22) Filed: Apr. 25, 2000

Related U.S. Application Data
(60) Provisional application No. 60/147,975, filed on Aug. 9, 1999.

(51) Int. Cl.[7] ............................................. G06F 17/00
(52) U.S. Cl. ....................... 235/375; 235/435; 235/487; 434/176; 434/178; 434/308; 434/317
(58) Field of Search ................................. 235/375, 435, 235/487, 383, 449; 345/173; 434/317, 178, 308, 176, 311; 341/26; 281/27

(56) References Cited

U.S. PATENT DOCUMENTS

| | | | |
|---|---|---|---|
| 4,021,932 A | | 5/1977 | Lipps |
| 4,273,538 A | * | 6/1981 | Ross .............................. 360/2 |
| 4,355,984 A | | 10/1982 | Slavik et al. |
| 4,425,098 A | | 1/1984 | Doring |
| 4,448,837 A | | 5/1984 | Ikeda et al. |
| 4,636,881 A | | 1/1987 | Brefka et al. |
| 4,703,573 A | | 11/1987 | Montgomery et al. |
| 4,706,536 A | | 11/1987 | Sanders |
| 4,809,246 A | | 2/1989 | Jeng |
| 4,884,974 A | * | 12/1989 | DeSmet ..................... 281/15.1 |
| 4,900,092 A | | 2/1990 | Van Der Westhuizen et al. |
| 4,913,463 A | | 4/1990 | Tlapek et al. |
| 4,990,092 A | * | 2/1991 | Cummings ................... 40/455 |
| 4,997,374 A | | 3/1991 | Simone |
| 5,088,928 A | | 2/1992 | Chan |
| 5,167,508 A | | 12/1992 | McTaggart |
| 5,174,759 A | | 12/1992 | Preston et al. |
| 5,191,329 A | | 3/1993 | Samreus |

(List continued on next page.)

FOREIGN PATENT DOCUMENTS

| | | |
|---|---|---|
| EP | 0 262 616 A | 4/1988 |
| EP | 0 609 048 | 3/1994 |

(List continued on next page.)

*Primary Examiner*—Karl D. Frech
*Assistant Examiner*—Daniel Walsh
(74) *Attorney, Agent, or Firm*—Lerner, David, Littenberg, Krumholz & Mentlik, LLP

(57) ABSTRACT

A method and system (10) for illustrating sound and text comprising a book (18) with pages (20) including illustrations and/or text, wherein at least some of the pages (20) include magnetic signatures (24). The system further includes a book holder (12) adapted to accept the book (18). As such, the book holder (12) has a reading surface (14) with a magnetic signature sensor (16), a cartridge slot (36), a reading controller (42), a speaker (44), and a power supply (46). The system also comprises a cartridge (34) adapted to be inserted in the cartridge slot (36). The cartridge (34) includes stored audio representations related to the illustrations and/or text of the pages (20). The magnetic signature sensor (16) is predisposed to detect the magnetic signatures (24) on the pages (20) as they are turned by a user viewing the book (18). Furthermore, the reading controller (42) is adapted to interact with the magnetic signature sensor (16) to determine what page or pages (20) the user is viewing and to retrieve the audio representations of the illustrations and/or text stored on the cartridge (34) corresponding to the page or pages (20) being viewed by the user. Thus, the reading controller (42) reproduces the audible sounds related to the retrieved audio representations through the speaker (44) for listening by the user.

14 Claims, 9 Drawing Sheets

U.S. PATENT DOCUMENTS

| | | | |
|---|---|---|---|
| 5,209,665 A | 5/1993 | Billings et al. | |
| 5,226,822 A | 7/1993 | Morris | |
| 5,263,865 A | 11/1993 | Zipf | |
| 5,290,190 A | 3/1994 | McClanahan | |
| 5,356,296 A | 10/1994 | Pierce et al. | |
| 5,368,488 A | 11/1994 | Gentile | |
| 5,374,195 A | 12/1994 | McClanahan | |
| 5,407,357 A | 4/1995 | Cutler | |
| 5,413,486 A | 5/1995 | Burrows et al. | |
| 5,417,575 A | * 5/1995 | McTaggart | 434/308 |
| 5,419,705 A | 5/1995 | Sandvik | |
| 5,437,552 A | 8/1995 | Baer et al. | |
| 5,453,013 A | 9/1995 | Billings et al. | |
| 5,466,158 A | * 11/1995 | Smith, III | 273/236 |
| 5,477,510 A | 12/1995 | Ukita | |
| 5,484,292 A | 1/1996 | McTaggart | |
| 5,485,176 A | 1/1996 | Ohara et al. | |
| 5,511,980 A | 4/1996 | Wood | |
| 5,517,407 A | 5/1996 | Weiner | |
| 5,520,544 A | 5/1996 | Manico et al. | |
| 5,531,600 A | 7/1996 | Baer et al. | |
| 5,534,888 A | 7/1996 | Lebby et al. | |
| 5,558,520 A | 9/1996 | Werzberger | |
| 5,567,163 A | 10/1996 | Ku | |
| 5,575,659 A | 11/1996 | King et al. | |
| 5,604,517 A | 2/1997 | Filo | |
| 5,609,488 A | 3/1997 | McTaggart | |
| 5,631,883 A | * 5/1997 | Li | 369/64 |
| 5,636,995 A | 6/1997 | Sharpe, III et al. | |
| 5,645,432 A | 7/1997 | Jessop | |
| 5,686,705 A | 11/1997 | Conroy et al. | |
| 5,697,793 A | * 12/1997 | Huffman et al. | 434/317 |
| 5,707,240 A | * 1/1998 | Haas et al. | 434/308 |
| 5,739,814 A | * 4/1998 | Ohara et al. | 345/173 |
| 5,761,485 A | * 6/1998 | Munyan | 326/8 |
| 5,795,213 A | 8/1998 | Goodwin | |
| 5,803,748 A | 9/1998 | Maddrell et al. | |
| 5,807,176 A | 9/1998 | Forsse et al. | |
| 5,810,604 A | * 9/1998 | Kopp et al. | 200/5 A |
| 5,829,985 A | 11/1998 | Campanella | |
| 5,851,119 A | * 12/1998 | Sharpe et al. | 434/169 |
| 5,877,458 A | 3/1999 | Flowers | |
| 5,888,070 A | 3/1999 | La Tour et al. | |
| 5,897,324 A | * 4/1999 | Tan | 345/901 |
| 5,954,514 A | 9/1999 | Haas et al. | |
| 5,991,085 A | * 11/1999 | Rallison et al. | 345/8 |
| 6,021,306 A | 2/2000 | McTaggart | |
| 6,041,025 A | 3/2000 | Ohga et al. | |
| 6,041,215 A | 3/2000 | Maddrell et al. | |
| 6,064,855 A | * 5/2000 | Ho | 345/901 |
| 6,164,534 A | 12/2000 | Rathus et al. | |
| 6,167,233 A | 12/2000 | Gresser, Jr. et al. | |
| 6,201,947 B1 | 3/2001 | Hur et al. | |
| 6,297,812 B1 | * 10/2001 | Ohara et al. | 345/173 |
| 6,313,828 B1 | * 11/2001 | Chombo | 345/169 |
| 6,314,474 B1 | * 11/2001 | Walter et al. | 710/14 |
| 6,330,427 B1 | 12/2001 | Tabachnik | |
| 6,331,867 B1 | * 12/2001 | Eberhard et al. | 345/824 |
| 6,416,326 B1 | 7/2002 | Oh | |
| 6,421,524 B1 | 7/2002 | Padgett | |
| RE37,929 E | 12/2002 | Fernandez | |
| 6,513,836 B2 | 2/2003 | Li | |
| 2001/0051329 A1 | 12/2001 | Lynch et al. | |
| 2002/0081560 A1 | 6/2002 | Ka-Wah et al. | |

FOREIGN PATENT DOCUMENTS

| | | | |
|---|---|---|---|
| EP | 0 702 366 A2 | | 3/1996 |
| JP | 56-32293 | | 9/1982 |
| JP | 357147767 A | * | 9/1982 |
| JP | 61-6797 | | 2/1986 |
| JP | 62-181979 | | 11/1987 |
| JP | 63-76873 | | 5/1988 |
| JP | 63-96898 | | 6/1988 |
| JP | 1-118456 | | 8/1989 |
| JP | 2-1962 | | 1/1990 |
| JP | 2-13037 | | 4/1990 |
| WO | WO 00/11634 | | 3/2000 |

* cited by examiner

METHOD AND SYSTEM FOR ILLUSTRATING SOUND AND TEXT

CROSS-REFERENCE TO RELATED APPLICATION

The application is commonly assigned and related to Provisional Application Serial No. 60/147,975 entitled "A System for Sound Illustrated Text," by Jin K. Song, filed Aug. 9, 1999, the entirety of which is incorporated herein by reference. This application claims priority on the aforementioned related provisional application.

FIELD OF THE INVENTION

The present invention relates generally to a method and system for illustrating sound and text. More particularly, the present invention relates to a method for illustrating sound and text utilizing a book holder adapted to accept a book with pages including illustrations and/or text, at least some of the pages including magnetic signatures. The present invention also relates to a method for electronically storing text and audio content for use in an electronic book reader system.

BACKGROUND OF THE INVENTION

Without limiting the scope of the invention, its background is described in connection with electronic book reader systems.

Substantial interest has long been given by the public to books which include sound illustration related to the text and/or illustration content within the book. Such sound illustrated books range in the industry from children's story books to manuals for learning a foreign language. Their popularity stems from the fact that a user can visually follow the text and/or illustration content in the book while listening to the audible representations corresponding to the text and/or illustration content.

The sound illustrated books enjoyed by the public today include pages comprising a pre-recorded sound chip which includes stored data (e.g., voice and sound). A problem with this type of sound illustrated book is that sound chips generally have a limited amount of memory storage capability. In addition, these chips are directly attached to each page. This can add significantly to the overall weight and girth of the page, or require the use of thick, almost cardboard-like, paper stock.

Other sound illustrated books are those that include a book and an audio cassette tape. The book, however, only has text and/or illustrations. It is the cassette tape that contains pre-recorded audio representations (e.g., voice and/or sound) which correspond with the text and/or illustrations on the pages of the book. In operation, the reader must follow the rhythm of the cassette. When the reader reaches a point for turning the page, a sound or voice instruction is heard indicating such action. If, however, the reader is not following attentively, the audio cassette will continue delivering audio representations until stopped manually, or until the cassette reaches its end. As such, the reader may find him/herself on the wrong page.

SUMMARY OF THE INVENTION

The present invention provides for an electronic book reader with a magnetic signature sensor capable of detecting magnetic signatures attached to pages of a book. The magnetic signatures can be placed at specified locations of the book and used by the reader to retrieve electronic equivalent representations of the text and/or illustrations on the pages for audible delivery.

Disclosed in one embodiment of the present invention is a system for illustrating sound and text. The system comprises a book with pages including illustrations and/or text. At least some of the pages include magnetic signatures which are attached in specific locations.

The system further comprises a book holder adapted to accept the book. The book holder includes a reading surface, which is a substantially flat platform, comprising a magnetic signature sensor. The magnetic signature sensor is predisposed to detect magnetic signatures on the pages as they are turned by a user viewing the book. The book holder further includes a cartridge slot adapted to receive a cartridge including stored audio representations related to illustrations and/or text on the pages of the book. The book holder also comprises a reading controller which is adapted to interact with the magnetic signature sensor to determine what page, or pages the user is viewing. Furthermore, the reading controller is adapted to retrieve audio representations of illustrations and/or text stored on the cartridge corresponding to the page, or pages being viewed by the user, as well as to reproduce audio sounds related to the audio representations though a speaker for listening by the user. The book holder also includes a speaker and a power supply which are communicably coupled with the reading controller. The power supply is adapted to control the activation and de-activation of the book holder.

Disclosed in another embodiment of the present invention is a method for illustrating sound and text utilizing a book holder which includes a reading controller, a speaker, and a magnetic signature sensor with one or more reading elements. The book holder is adapted to accept a book with pages including illustrations and/or text, wherein at least some of the pages include magnetic signatures. The method comprises the step of attaching the magnetic signatures in a specified location on pages of the book. The book is then placed on the book holder in a position wherein the magnetic signatures on the pages of the book are properly aligned with the reading elements of the magnetic signature sensor on the reading surface of the book holder. Once in position, the pages of the book can then be turned in order to view the illustrations and/or text therein.

The method further comprises the step of detecting the specified locations of the magnetic signatures on the pages utilizing the reading elements of the magnetic signature sensor. As such, the illustrations and/or text on each of the pages are identified by the magnetic signatures attached in the specified locations on the pages.

The method also comprises the step of correlating the specified locations with stored audio representations related to the illustrations and/or text on the pages within the book. The audio representations are then retrieved and reproduced in preparation for audible delivery.

The method further comprises the step of delivering audible sounds corresponding to the stored audio representations via a speaker to accompany the illustrations and/or text on the page or pages of a book.

In another embodiment of the present invention disclosed is a method for electronically storing text and audio content for use in an electronic book reader system. The method comprises the step of creating electronic equivalent representations of the text and audio content which corresponds to illustrations and/or text on the pages within the book. Thus, the creating step further includes the step of recording sounds and/or words related to the illustrations and/or text of the book for viewing and listening by a user.

The method further comprises the step of storing the electronic equivalent representations in a first electronic memory space. In order to store this data, the electronic equivalent representations are formatted into a digital format. The digital formatted electronic equivalent representations are then sorted into a plurality of addresses (e.g., A0, A1, A2 . . . An) within the first electronic memory space. Once the electronic equivalent representations are sorted, the digital formatted data is packaged utilizing a chip housed within a cartridge means. The cartridge means is then inserted into an electronic book reader system adapted to receive the cartridge means. Upon inserting the cartridge means into the electronic book reader system, a duplicate of the electronic equivalent representations stored in the first electronic memory space is downloaded into a second electronic memory space which is housed within the electronic book reader system. Thus, the electronic equivalent representations are stored in identical addresses in both memory spaces for easy identification and retrieval.

In yet another embodiment of the present invention disclosed is an electronic book reader system for illustrating sound and text. The system comprises a reading surface adapted to accept a book with pages including illustrations and/or text, wherein at least some of the pages include magnetic signatures attached at specified locations. The system also comprises a book support surface adjoined to one side of the reading surface. The book support surface is adjoined to the reading surface by a means adapted to fold in a manner allowing for both surfaces to meet for easy carrying of the electronic book reader system. As such, the reading surface and book support surface are substantially flat platforms. In addition, the system also comprises a bracket coupled to one side of the reading surface adapted to hold the book in place while the page, or pages are being turned by a user.

The system further comprises a magnetic signature sensor which includes one or more individualized reading elements. The reading elements are pre-aligned on the reading surface in order to correspond with the magnetic signatures at their specified locations on the pages within the book. The magnetic signature sensor is predisposed to detect the magnetic signatures on the pages as they are turned by the user viewing the book.

The system also comprises a reading controller which is adapted to interact with the magnetic signature sensor in order to determine what page, or pages the user is viewing. Communicably coupled with the reading controller is a power supply adapted to activate and de-activate the functionality of the electronic book reader system. The power supply is further coupled with a Light Emitting Diode (LED) indicator for determining the state (e.g., on/off) of the reader system.

The system also comprises a cartridge slot within the electronic book reader adapted to receive a cartridge. The cartridge includes stored audio representations related to the illustrations and/or text of the pages within the book. The stored audio representations of the illustrations and/or text within the cartridge corresponding to the page, or pages being viewed by the user are retrieved and reproduced by the reading controller. A speaker, which is communicably coupled with the reading controller, is then utilized in delivering the audio representations for listening and reading along with the page, or pages viewed by the user.

Disclosed in another embodiment of the present invention is a cartridge device for storing text and audio content converted into electronic equivalent representations for use in an electronic book reader system. The device comprises a carrier means for housing the electronic equivalent representations. The carrier means can include a box with a top surface, a bottom surface, a first side, a second side, a front side and a back side.

The device further comprises a chip adapted to store the electronic equivalent representations. The chip further includes a first electronic memory space configured to store the electronic equivalent representations. The first electronic memory space also includes a memory array comprising a plurality of addresses (e.g., A1, A2 . . . An) for sorting the electronic equivalent representations. As such, the first electronic memory space is configured to communicate with a second electronic memory space housed within the electronic book reader system. Both memory spaces include identical addresses for easy storing and retrieving of the electronic equivalent representations.

The device further comprises a plurality of pins adapted to communicate with the electronic book reader system. The plurality of pins are located on the front side of the carrier means and are adapted for inserting into the electronic book reader system. Thus, the pins allow for the chip to download the stored data in a first memory space to corresponding addresses in a second memory space.

A technical advantage of the invention is an electronic book reader system which allows for the reader to follow along one page at a time using digital means. As such, the reader is in control of his or her reading speed and audible representations delivered by a speaker as the reader turns each page.

BRIEF DESCRIPTION OF THE DRAWINGS

For a more complete understanding of the present invention including its features and advantages, reference is made to the following detailed description of the invention in conjunction with the accompanying drawings of which.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
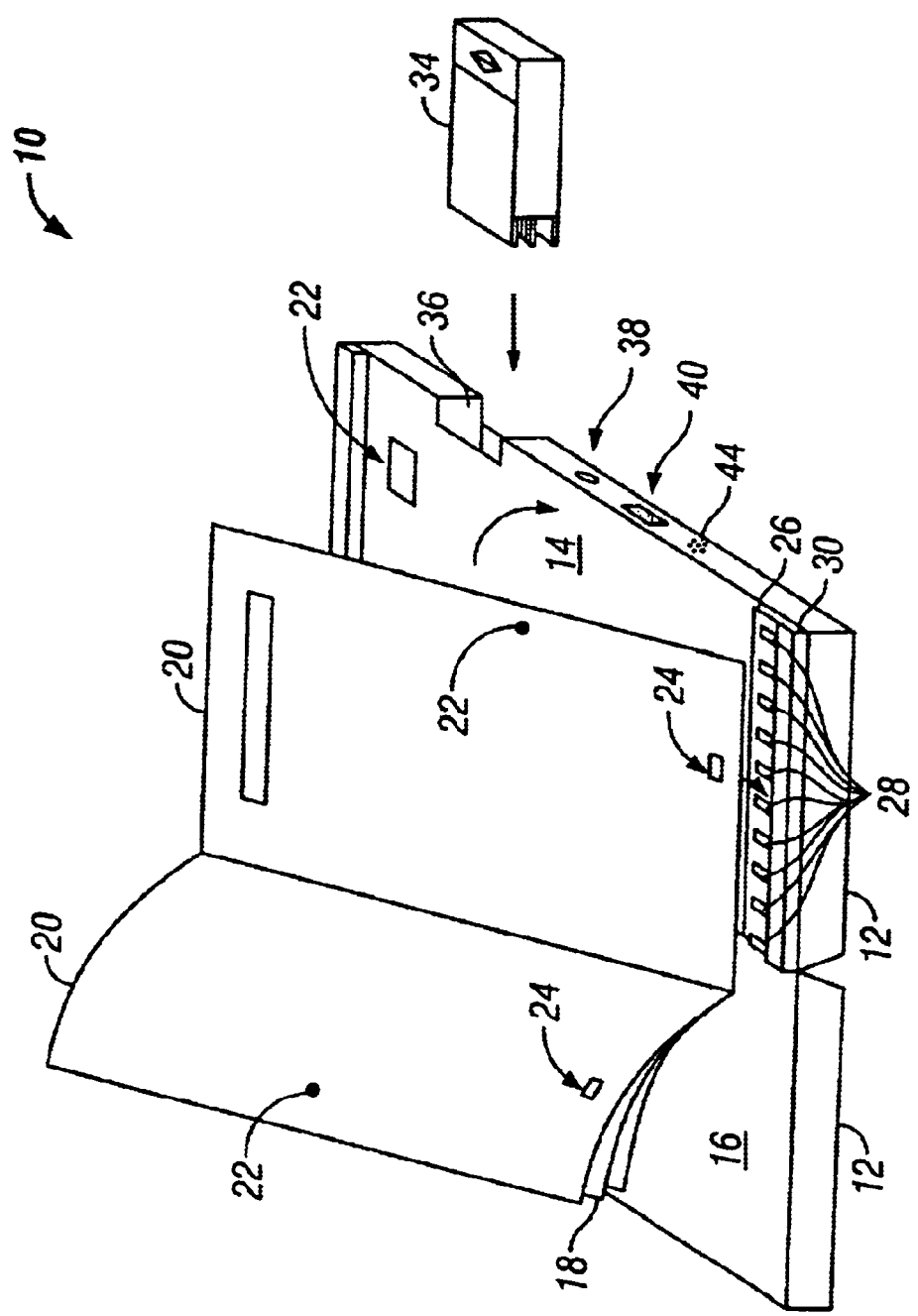
FIG. 1 illustrates an electronic book reader system according to a preferred embodiment of the present invention.

To better understand the invention, reference is made to FIG. 1, which depicts an electronic book reader system 10 for illustrating sound and text, in accordance with the preferred embodiment of the present invention. The electronic book reader 10 comprises a reading surface 14 and a book support surface 16, which are substantially flat platforms. The book support surface 16 is adjoined to one side of the reading surface 14 by a means adapted to fold in a manner allowing for both surfaces 14,16 to meet for easy carrying of the electronic book reader system 10. The reading surface 14 is adapted to accept a book 18 with pages 20. On the other hand, the book support surface 16 is adapted to support the pages 20 viewed by a user. Together, the book support surface 16 and the reader surface 14 form a book holder 12.

The book 18 accepted by the reading surface 14 further comprises pages 20 including illustrations and/or text. Each of the pages 20 include a magnet 22 which allows for the page, or pages being viewed by the user to remain open on the reading surface 14 and book support surface 16. Some of the pages 20 also include magnetic signatures 24 which are attached at specified locations on the pages 20. Magnetic signatures 24 are utilized in identifying the page 20 being viewed by the user, as well as detecting the content of the particular page 20.

The electronic book reader system 10 also comprises a magnetic signature sensor 26 which is incorporated as part of the reading surface 14. The magnetic signature sensor 26 includes one or more individualized reading elements 28. These reading elements 28 are pre-aligned on the reading surface 14 in order to correspond with the magnetic signatures 24 at their specified locations. The magnetic signature sensor 26 is predisposed to detect the magnetic signatures 24 on the pages 20 as they are turned by a user viewing the book 18. In operation, the book 18 is placed on the book holder 12 and held in place by a bracket 30 which is located at the bottom edge of the reading surface 14. Holding the book 18 in place is important in order to allow the reading elements 28 to properly correspond with the magnetic signatures 24 on the pages 20.

The electronic book reader system 10 further comprises a cartridge 34, or digital means (e.g., CD), and a cartridge slot 36. The cartridge slot 36 is part of the book holder 12 and is adapted to receive the cartridge 34. The cartridge 34 can include stored audio representations related to the illustrations and/or text on the page, or pages 20. Once the cartridge 34 is inserted into cartridge slot 36, the power can then be turned on, indicated by an LED indicator 38. Audio representations of the illustrations and/or text on pages 20 can then be heard through a speaker 44. The volume of the audio representations heard through the speaker 44 can be controlled by a volume controller 40 which allows for enjoyable listening while reading along with the pages 20 viewed by the user.

Figure 2:
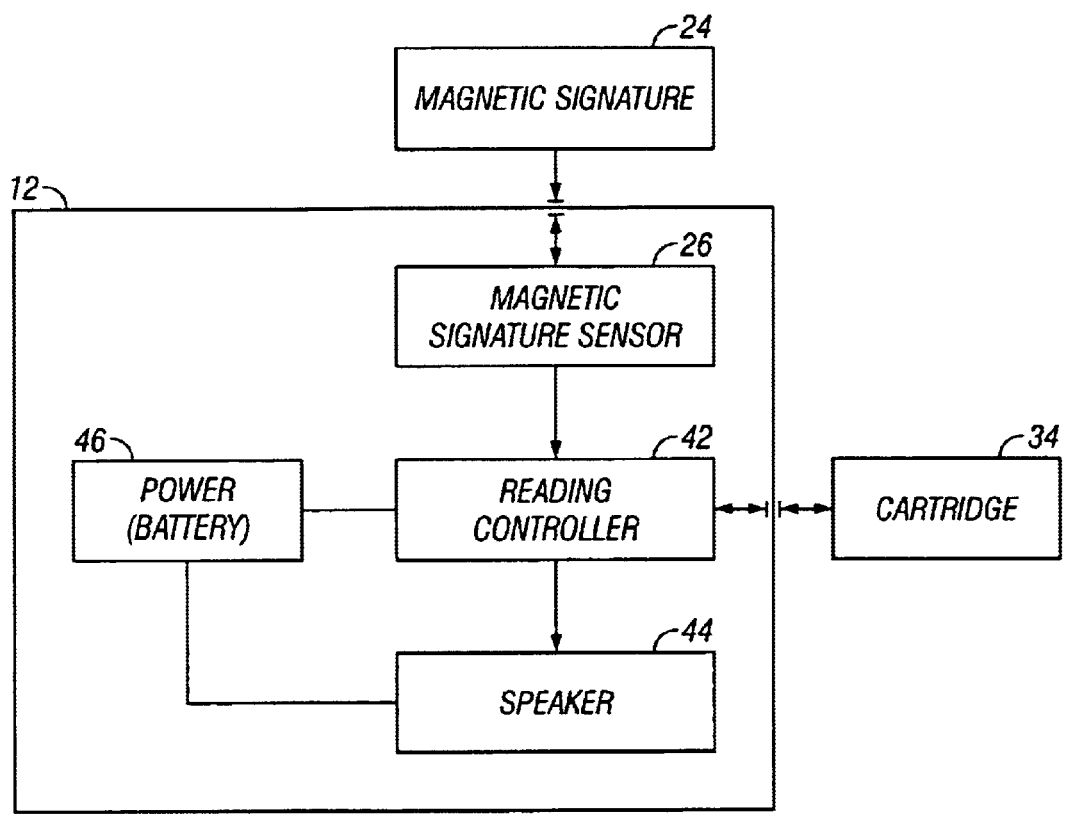
FIG. 2 shows a block diagram of the electronic book reader system in accordance with the preferred embodiment of the present invention.
Figure 3A:
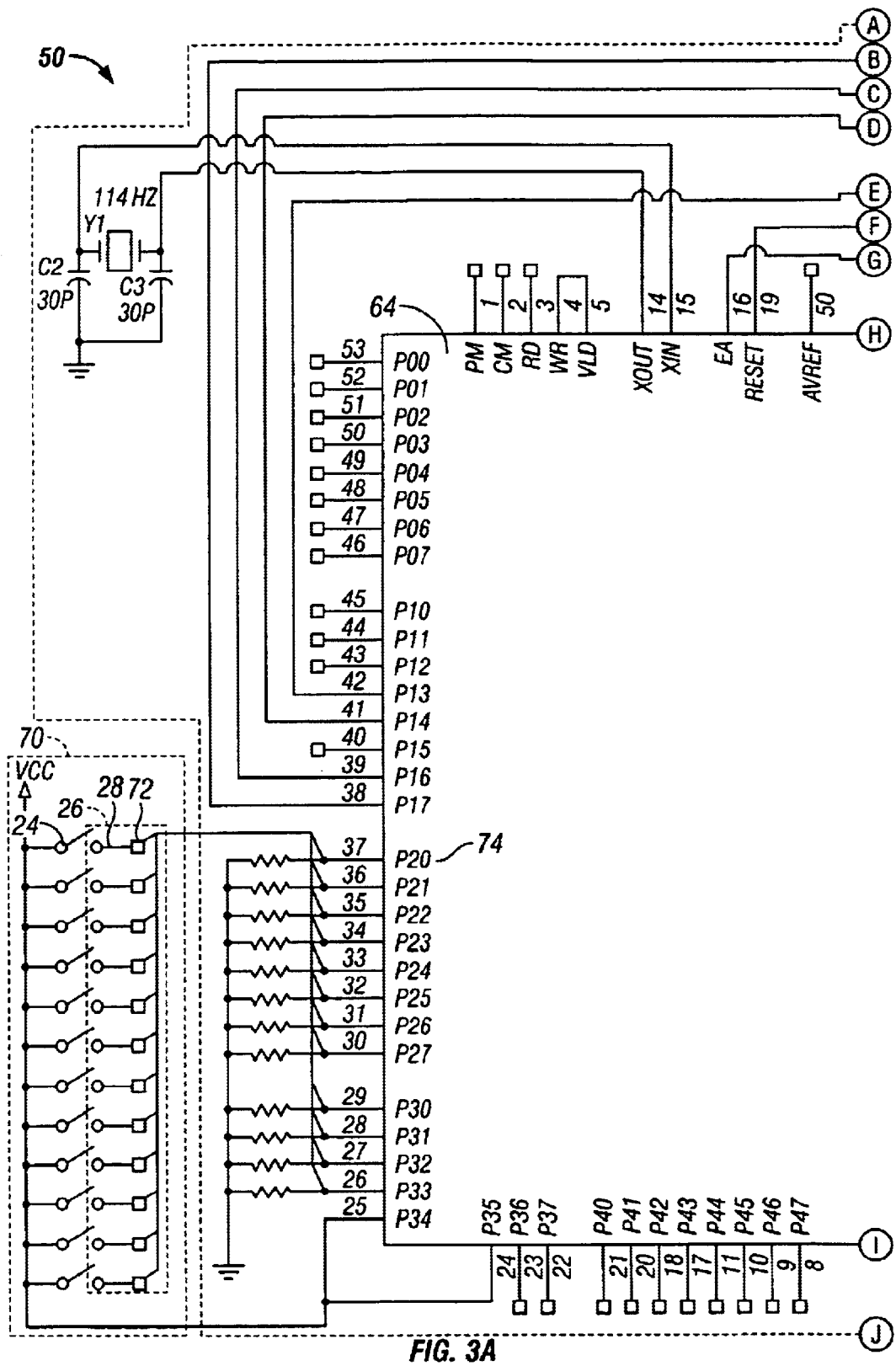
FIGS. 3a–3e schematic-diagram illustrating one embodiment of the present invention.
Figure 3B:
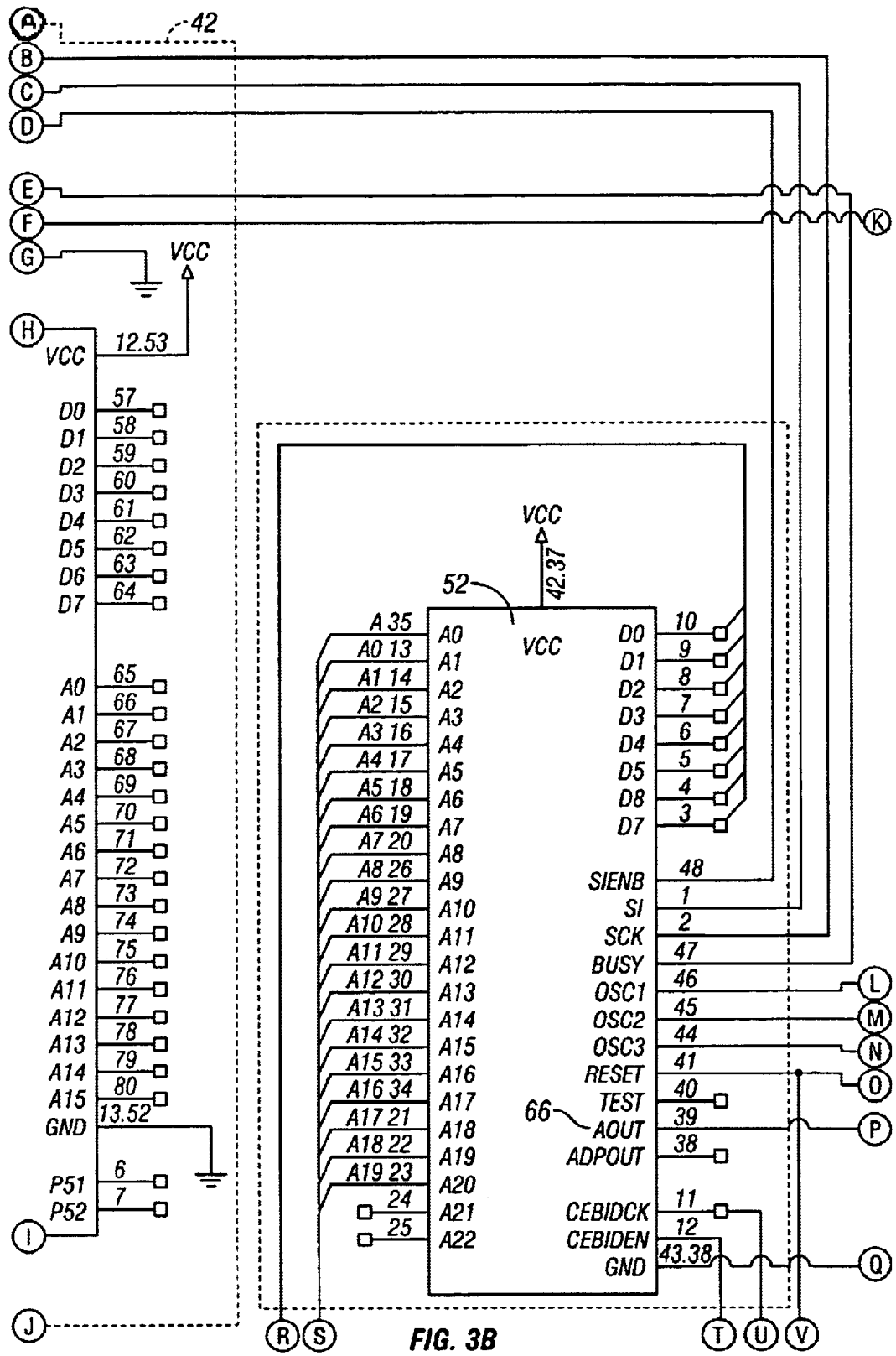
Figure 3C:
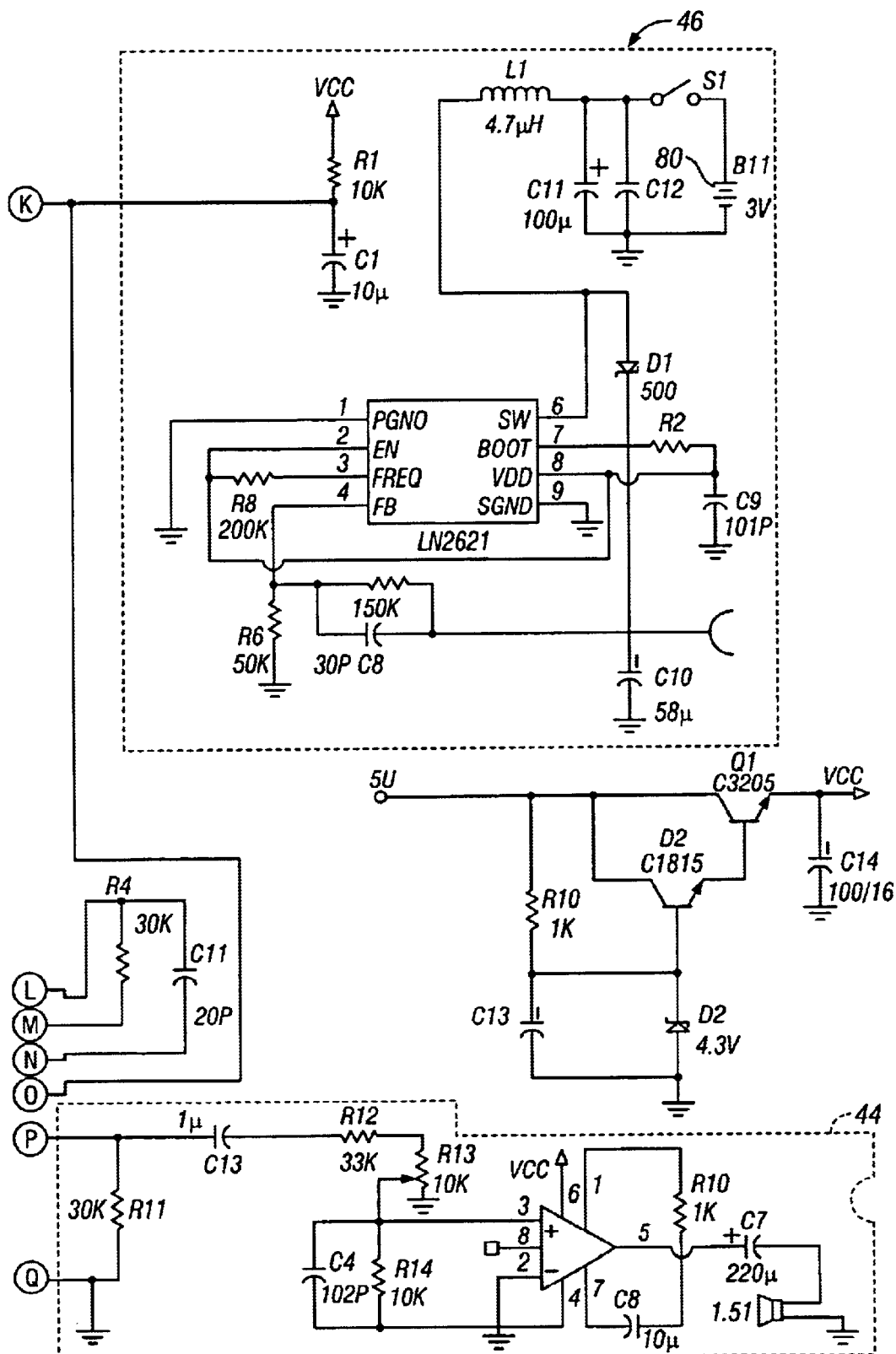
Figure 3D:
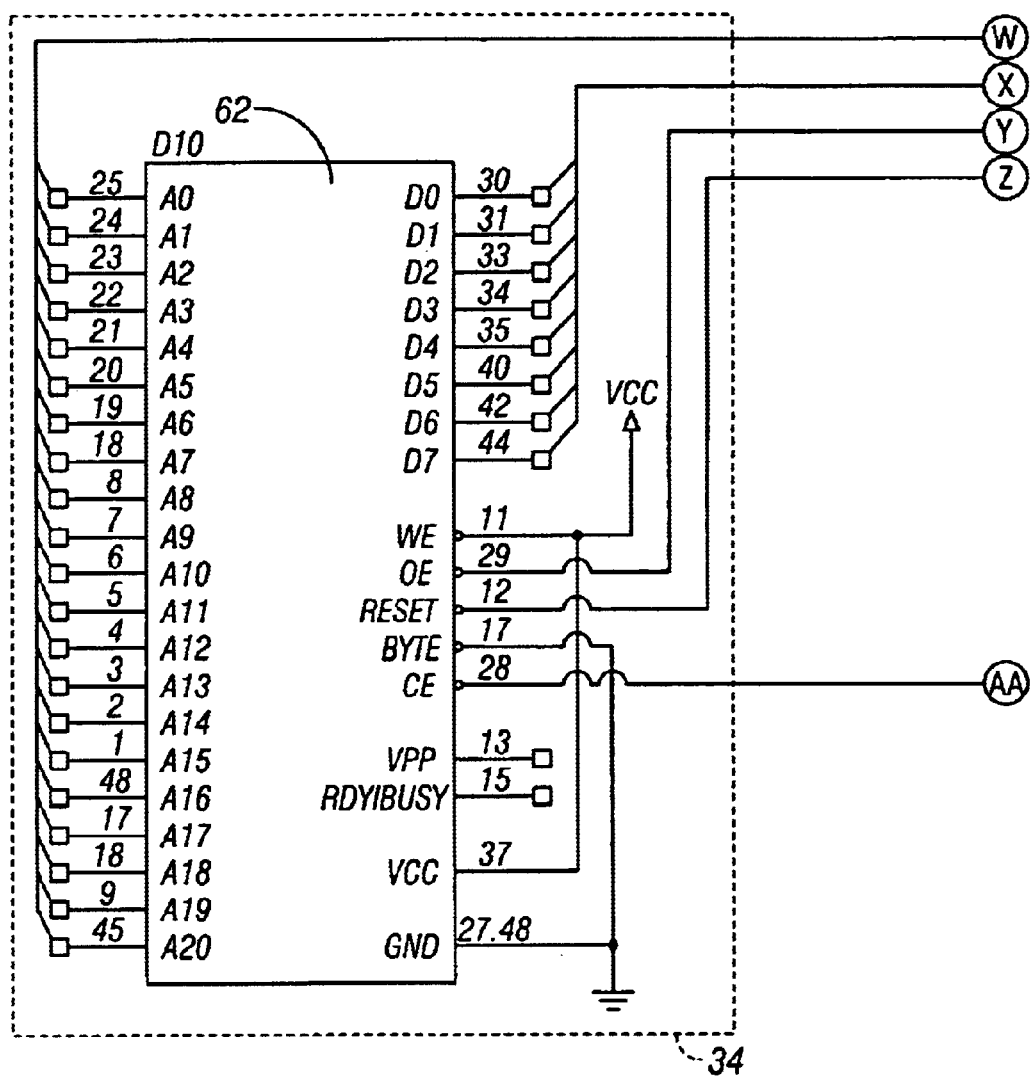
Figure 3E:
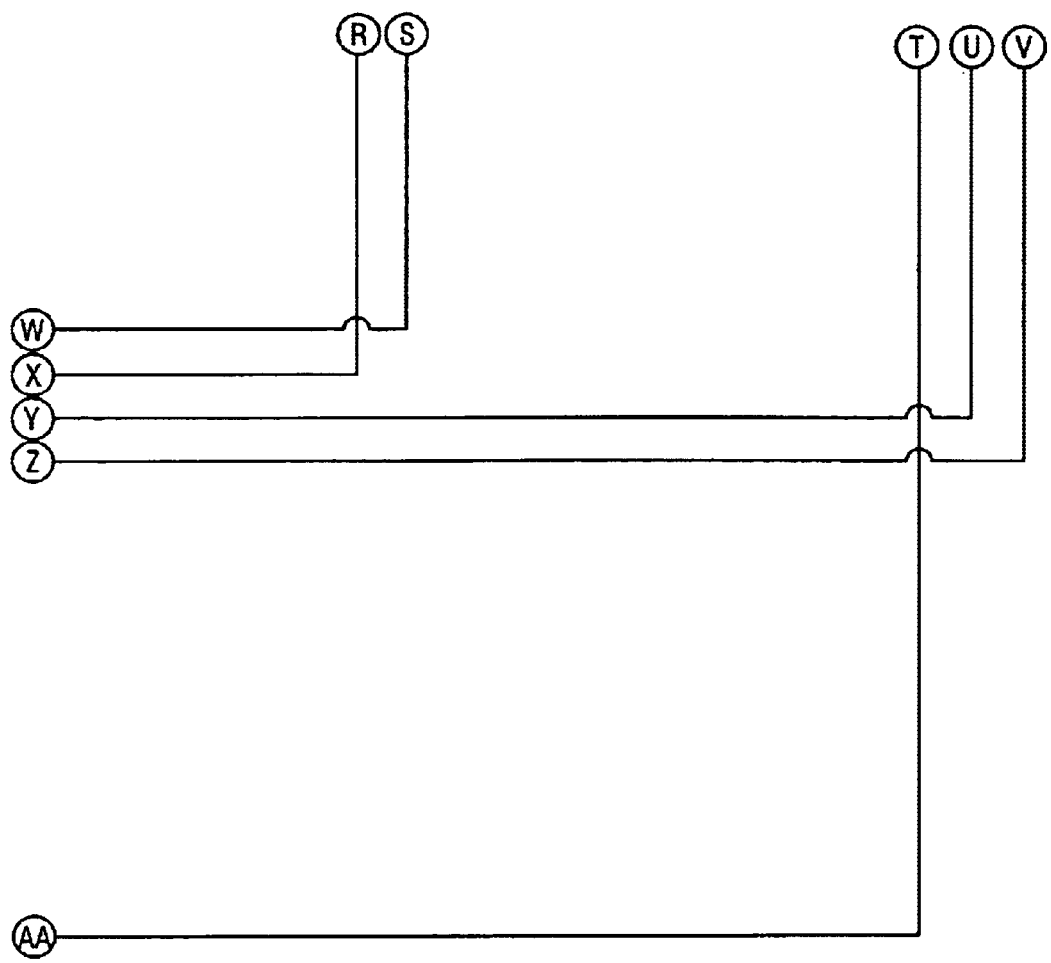
Figure 3E:
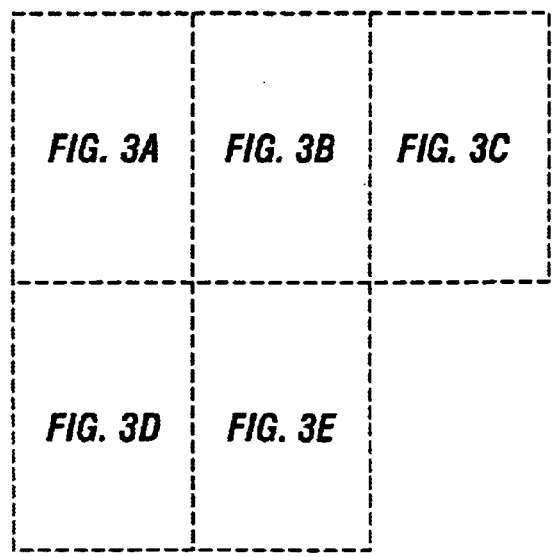

With reference to FIG. 2, a block diagram of the electronic book reader system for illustrating sound and text 10 is shown in accordance with the preferred embodiment of the present invention. In triggering the sensor properties of the system 10, a magnetic signature 24 attached in a specified location on a page 20 within a book 18 must make contact with a magnetic signature sensor 26, which comprises one or more individualized reading elements 28. Once the book 18 has been placed on the book holder 12, a user can then turn each page 20 of the book 18 individually in order to view illustrations and/or text on some of the pages 20. Upon the turning of each page 20, the magnetic signature 24 located on the page 20 being viewed will make contact with an individualized reading element 28 which is pre-aligned on the reading surface 14 of the book holder 12. Once the magnetic signature 24 has been detected by its corresponding reading element 28, the magnetic signature sensor properties 26 are triggered. The reading controller 42, which is communicably coupled with the magnetic signature sensor 26, is adapted to interact with magnetic signature sensor 26 in order to determine what page, or pages 20 the user is viewing. A correlation is then made between the detected specified location via the magnetic signature 24 and the stored audio representations related to the illustrations and/or text on the page, or pages 20 of the book 18. The objective is to retrieve only the audio representations corresponding to the text and/or illustrations on the detected page 20 so as to allow the user to listen and follow such text and/or illustrations. The audio representations, may include words and/or music, for example.

The components housed within the book holder 12 are operated by a power supply 46, which may include, for example, 3V batteries. The power supply 46, which is communicably coupled with the reading controller 42, is adapted to activate and de-activate the functionality of the electronic book reader system 10. The power supply 46 is, for example, activated by an on/off switch (not shown). In addition, a speaker 44 is also communicably coupled with the reading controller 42 and further adapted to deliver audio representations in order for the user to listen and read along with the page, or pages 20 being viewed by the user. Such audio representations can be retrieved from a cartridge 34 which includes stored electronic equivalent representations related to the illustrations and/or text corresponding to the pages 20.

Turning now to FIGS. 3a–3e, a schematic diagram illustrating one embodiment of the present invention is shown and denoted generally as 50. As previously discussed, each of the pages 20, which include magnetic signatures 24, are turned individually in order to activate the sensor properties 70. Each magnetic signature 24 corresponds with one individualized reading element 28. An array of reading elements 28, together form a magnetic signature sensor 26 located on the reading surface 14 of the book holder 12.

In one embodiment, Page 1 of book 18 can include illustrations and/or text. As Page 1 is viewed by a user on the reading surface 14 of the book holder 12, the magnetic signature 24 on Page 1 will correspond with a pre-aligned reading element 28 on the reading surface 14. The magnetic signature 24 contacts the reading element 28 of the magnetic signature sensor 26, and a bridge is formed between the two sensor properties. A signal for Page 1 is then sent through the logic 64 contained within the reading controller 42. The logic 64 of the reading controller 42 contains addresses (e.g., P2.0, P2.1 . . . P5.1) which correspond with the pins 72 of the magnetic signature sensor 26. Page 1 will then have a signal carried by a current which will correspond with address (e.g., P2.0) 74 of the reading controller logic 64. This allows for Page 1 to be identified as such in order to retrieve its contents.

The reading controller 42 is adapted to interact with the magnetic signature sensor 26 in order to determine what page, or pages 20 the user is viewing. The reading controller 42 via logic 64 will then communicate with the corresponding address in the system 10 internal memory, or second memory space 52, which contains the corresponding electronic equivalent representations. The electronic equivalent representations include text and audio content which is stored on a chip (not shown) in a cartridge 34. Prior to storing, the text and audio content is converted into a digital format. This data is then stored on the chip comprising a first memory space 62. The first electronic memory space 62 includes a memory array which comprises a plurality of addresses (e.g., A1, A2 . . . An) for sorting the electronic equivalent representations. When the cartridge 34 housing the chip including the first electronic memory space 62 is inserted into the cartridge slot 36 of the electronic book reader system 10, the digital data stored on the chip is downloaded into corresponding addresses (e.g., A1, A2 . . . An) in the second memory space 52. Thus, each address will contain the electronic equivalent representations corresponding to the page, or pages 20 which are being viewed by the user. The electronic equivalent representations are then delivered via AOUT 66, or an audio output signal. The audio output signal 66 is then carried to the reading controller 42, which is communicably coupled with a speaker 44. Speaker 44 is adapted to deliver the audio representations carried out by AOUT 66 for listening and reading along with the page, or pages 20 viewed by the user. Only the page, or pages 20 being viewed by the user will be delivered by the speaker 44 in order that the user may control his/her speed of reading. The system 10 functions using a power supply 46 which is communicably coupled with the reading controller 42. Power supply 46 is adapted to activate and de-activate the functionality of the electronic book reader system 10. The power supply 46 may include, for example, a 3V battery 80.

Figure 4A:
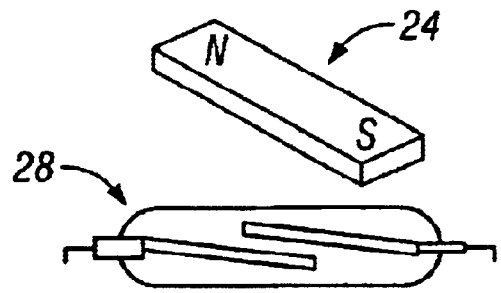
FIGS. 4a–4c are magnetic signatures which may be implemented in the preferred embodiment of the present invention.
Figure 4B:
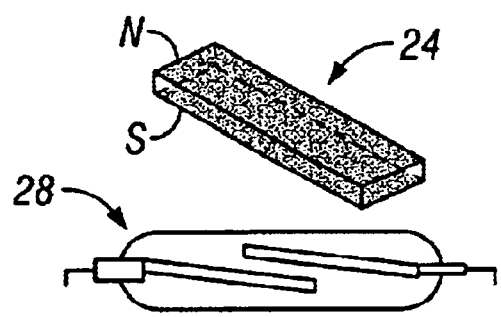
Figure 4C:
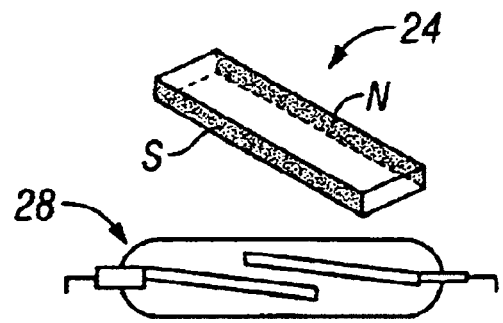

With reference to FIGS. 4a–4c, therein are shown magnetic signatures which may be implemented in the preferred embodiment of the present invention. In one embodiment of the present invention, as shown in FIG. 4a, the array of magnetic signatures 24, which are attached to at least some of pages 20 of a book 18, may include magnets with polarization (e.g., N and S) on both ends of each magnet. If the magnetic signature 24 with polarizations on either end of the magnet is utilized, the magnetic signature sensor 26 comprising one or more individualized reading elements 28 must correspond accordingly. Other variations of magnetic signatures 24 which may be implemented in a preferred embodiment of a present invention may include magnetic signatures 24 which have polarization on the top and bottom surfaces of the magnetic signature 24 and/or magnetic signatures 24 with polarization on either side of the magnetic signature 24. Again, regardless of the array of magnetic signatures 24 which are utilized in the system 10, the magnetic signature sensor 26 must be able to detect the corresponding magnetic signature 24 via the reading elements 28.

Figures 5, 6:
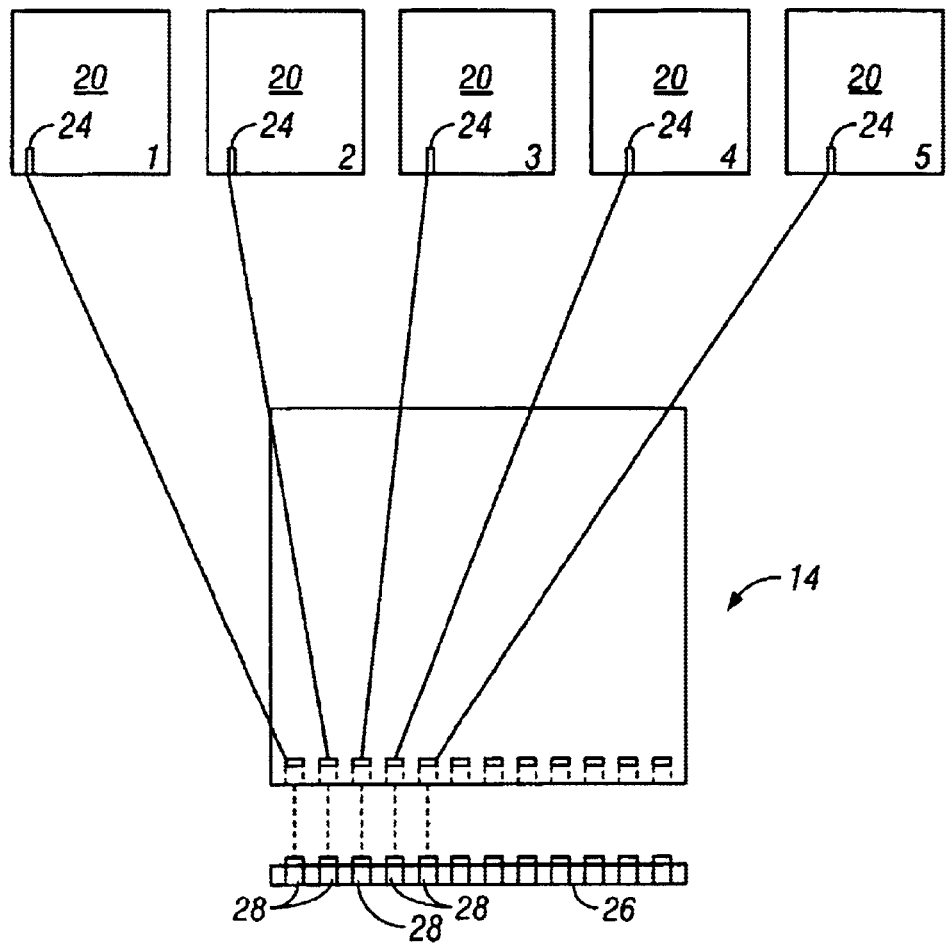
FIG. 5 depicts the relationship between the magnetic signatures and the magnetic signature sensor.
FIG. 6 is a logic diagram depicting the sensor state at each level of one embodiment of the present invention.

With reference to FIG. 5, therein is shown the relationship between the magnetic signatures 24 and the magnetic signature sensor 26. In one embodiment, a book 18 may include five (5) pages 20, each containing illustrations and/or text therein. Therefore, each of the five (5) pages 20 will include a magnetic signature 24 which is attached at a specified location on each of page 20. The magnetic signatures 24 are small in size and will not require the page, or pages 20 to be significantly altered.

The reading surface 14 of the system 10 comprises a magnetic signature sensor 26 which includes one or more individualized reading elements 28. In one embodiment, only five (5) of the reading elements 28 will be utilized. The reading elements 28 are pre-aligned on the reading surface 14 in order to correspond with the magnetic signatures 24 at their specified locations on each of the pages 20.

A user will then place the book 18 containing five (5) of pages 20 on the reading surface 14. As the user views the illustrations and/or text on Page 1, the magnetic signature 24 on Page 1 will be detected by the reading element 28 of the magnetic signature sensor 26 corresponding to the magnetic signature 24 on Page 1. As the magnetic signature 24 of Page 1 comes into contact with the corresponding reading element 28, a Low (L) voltage signal will be depicted as shown in FIG. 6. The other magnetic signatures 24 will remain in a High (H) state until detected. Such signal from the corresponding sensor will then communicate with the logic 64 contained within the reading controller 42. It is the logic 64 which enables the reading controller 42 to retrieve the electronic equivalent representations corresponding to the text and/or illustrations on Page 1 and deliver them to in speaker 44 from a second memory space 52.

This sequence will then continue with the user turning to Page 2, which includes illustrations and/or text. As shown in FIG. 6, while the user is viewing Page 2, two Low (L) voltages will be detected. This will, however, indicate that the user is on Page 2, and thus, retrieve the corresponding electronic equivalent representations stored in the second memory space 52 for delivery in an audible manner to the user. Only the electronic equivalent representations corresponding to the text and/or illustrations on Page 2 will be delivered by speaker 44 to the user. No additional sound will be heard until the user decides to turn to Page 3. As such, the user can control the speed of his/her reading of book 18for enjoyment purposes.

While this invention has been described with a reference to illustrative embodiments, this description is not intended to be construed in a limiting sense. Various modifications and combinations of the illustrative embodiments as well as other embodiments of the invention will be apparent to persons skilled in the art upon reference to the description. It is, therefore, intended that the appended claims encompass any such modifications or embodiments.

What is claimed is:

1. A method for electronically storing text and audio content of a book for use in an electronic book reader system, said electronic book reader system including a book holder for holding said book, the method comprising the steps of:

providing a book comprising a plurality of pages having text thereon, said book being adapted, arranged and structured so as to be held by said book holder of said electronic book reader system so as to be viewed by a user;

creating electronic equivalent representations of said text of said book and audio content corresponding to said text;

storing said electronic equivalent representations in a first electronic memory space; and downloading a duplicate of said electronic equivalent representations stored in said first electronic memory space into a second electronic memory space housed within said book holder of said electronic book reader system, said downloaded duplicate of said electronic equivalent representations stored in said second electronic memory space corresponding to said pages of said book held by said book holder, whereby said electronic equivalent representations of said second electronic memory space include audio content corresponding to said pages of said book being held by said book holder and viewed by the user.

2. The method according to claim 1 wherein said pages of said book include thereon illustrations and text, and wherein said creating step further includes recording sounds and/or words according to said illustrations and/or text of said pages of said book.

3. The method according to claim 1 wherein said storing step further includes formatting said electronic equivalent representations into a digital format.

4. The method according to claim 1 wherein said storing step further includes sorting said electronic equivalent representations into a plurality of addresses within said first electronic memory space.

5. The method according to claim 1 wherein said storing step is followed by packaging said electronic equivalent representations stored in said first electronic memory space utilizing a chip housed within a cartridge means.

6. The method according to claim 5 wherein said packaging step is followed by inserting said cartridge means into said electronic book reader system adapted to receive said cartridge means.

7. The method according to claim 1 wherein said book holder includes a reading surface having a sensor for detecting said pages as they are turned by a user viewing said book.

8. The method according to claim 7 wherein said reading surface is a substantially flat platform.

9. The method according to claim 1 wherein said method further comprises delivering audible sounds corresponding to said stored audio content via a speaker to accompany said illustrations and/or text on said pages.

10. The method according to claim 7 wherein said sensor includes at least one reading element, and said book includes signatures adapted and arranged to be detected by said sensor, the method further comprising placing said book on said book holder in a position wherein said signatures on said pages of said book are properly aligned with said at least one reading element of said sensor.

11. The method according to claim 10 wherein said placing step is followed by the step of turning said pages of said book in order to view illustrations and/or text therein.

12. The method according to claim 11 wherein said turning step further includes the step of identifying the illustrations and/or text on said pages utilizing said signatures attached in specified locations on said pages detected by said at least one reading element of said sensor.

13. The method according to claim 9 wherein said delivery step is preceded by the step of retrieving said stored audio of said illustrations and/or text corresponding to said pages being viewed by a user.

14. The method according to claim 13 wherein said retrieving step is followed by the step of reproducing the stored audio of said illustrations and/or text retrieved corresponding to said pages being viewed by a user.

* * * * *